United States Patent [19]

Noguchi et al.

[11] Patent Number: 5,688,886
[45] Date of Patent: Nov. 18, 1997

[54] ACRYLIC RUBBER COMPOSITION

[75] Inventors: Takeshi Noguchi, Kyoto; Tadahiro Inada, Tatsuno; Yoshiharu Kusaka, Yokohama, all of Japan

[73] Assignee: Showa Highpolymer Co., LTD., Tokyo, Japan

[21] Appl. No.: 738,347

[22] Filed: Oct. 25, 1996

Related U.S. Application Data

[63] Continuation of Ser. No. 411,698, Apr. 26, 1995, abandoned, filed as PCT/JP94/01295 on Aug. 04, 1994.

[30] Foreign Application Priority Data

Aug. 6, 1993 [JP] Japan .................. 5-196305

[51] Int. Cl.⁶ .................................. C08F 24/00
[52] U.S. Cl. ........................... 526/273; 526/292.1
[58] Field of Search .................... 526/320, 273, 526/292.1

[56] References Cited

U.S. PATENT DOCUMENTS

| | | | |
|---|---|---|---|
| 5,194,540 | 3/1993 | Yamamoto et al. | 526/320 |
| 5,216,101 | 6/1993 | Kawanaka et al. | 526/320 |
| 5,252,678 | 10/1993 | Yamamoto et al. | 526/320 |
| 5,334,683 | 8/1994 | Kawanaka et al. | 526/320 |

FOREIGN PATENT DOCUMENTS

| | | | |
|---|---|---|---|
| 0103146 | 3/1984 | European Pat. Off. | 526/320 |
| 0158161 | 10/1985 | European Pat. Off. | 526/320 |
| 570093 | 11/1993 | European Pat. Off. | 526/320 |
| 58-208165 | 12/1983 | Japan | 526/320 |
| 3237181 | 10/1991 | Japan | 526/320 |
| 962109 | 6/1964 | United Kingdom | 526/320 |

*Primary Examiner*—Joseph L. Schofer
*Assistant Examiner*—N. Sarofim
*Attorney, Agent, or Firm*—Oblon, Spivak, McClelland, Maier & Neustadt, P.C.

[57] ABSTRACT

An acrylic rubber composition containing an acrylic ester polymer having a weight-average molecular weight of at least 8,000,000 as a rubber component. This acrylic rubber composition which is free from the disadvantages associated with conventional acrylic rubber can be obtained economically by avoiding the use of expensive raw materials and complicated and therefore costly steps. The acrylic rubber composition shows improvements in the properties inherently possessed by acrylic rubber, i.e., heat resistance, oil resistance, weather resistance, and ozone resistance; exhibits excellent roll processability, gasoline resistance, gas hole resistance, and tensile strength/extensibility balance; and in addition, has high mechanical strength and excellent compression set resistance.

4 Claims, No Drawings

ACRYLIC RUBBER COMPOSITION

This application is a Continuation of application Ser. No. 08/411,698, filed on Apr. 26, 1995, now abandoned, originally filed as International Application No. PCT/JP94/01295 on Aug. 4, 1994.

TECHNICAL FIELD

This invention relates to an acrylic rubber composition and more particularly to an acrylic rubber composition having excellent processability, mechanical strength and resistance to compression set as well as improved resistance to heat, weather, ozone, cold, and oil; and, which is useful as a molding material for seals, packing, hoses, etc.

BACKGROUND ART

As acrylic rubber is excellent in heat resistance, weather resistance, oil resistance and ozone resistance it is widely used as O-rings, packing, gaskets, hoses and belts in automobiles.

However, conventional acrylic rubber is disadvantageous in that it generally presents difficulty in roll processing due to its tendency to stick to the rolls, it is inferior in compression set resistance and mechanical strength, particularly in tensile strength, and in that it is not satisfactory in cold resistance and solvent resistance.

With recent improvements in engines accomplished as counter-measures against regulations regarding automobile exhaust and in pursuit of improved performance, the development of an acrylic rubber having improved strength and resistance to compression set in addition to heat resistance, oil resistance, weather resistance and ozone resistance has become necessary.

In an attempt to obtain acrylic rubber that eliminates the aforesaid disadvantages and meets various demands, studies have been focused chiefly on polymer compositions, especially on changes in the kind and amount of functional group-containing monomers and polymer blends.

An example of the former is Japanese Patent Laid-Open No. 2-251556 which discloses a modified acrylic rubber composition comprising an acrylic copolymer obtained by reacting a carboxyl-containing acrylic copolymer with a compound containing an epoxy group reactive with the carboxyl group and an unsaturated group per molecule and an organic peroxide; An example of latter is Japanese Patent Laid-Open No. 62-19024 which proposes a polymer blend comprising an acrylic ester polymer and a fluorine-containing polymer.

However, the conventional techniques have several demerits, such as the high cost of raw materials, the complicated nature of the processing steps involved, and insufficient performance properties. Thus, they are not necessarily deemed satisfactory.

The incorporation of components, such as vulcanizing agents, fillers and lubricants, or the alteration of mixing, vulcanization or molding conditions can achieve certain improvements but complete satisfaction can not be reached through the use of such means.

Thus, methods for improving acrylic rubber can roughly be directed into the alteration of the polymer composition constituting acrylic rubber and the alteration of factors other than the polymer composition, such as the addition of additives or alterations to molding conditions. The present invention belongs to the former category.

An object of the present invention is to overcome the disadvantages associated with conventional acrylic rubber without involving the use of expensive materials or complicated steps entailing an increase in cost. That is, the object is to provide an improved acrylic rubber composition at a low cost, said acrylic rubber composition showing improvements in the properties inherent to acrylic rubber, such as heat resistance, oil resistance, weather resistance, and ozone resistance, and also exhibiting excellent properties in roll processability, gasoline resistance, gas hole resistance, tensile strength/extensibility balance, mechanical strength, and resistance to compression set.

DISCLOSURE OF THE INVENTION

As a result of extensive investigation, the present inventors have overcome the above problems. That is, the present invention provides, first, an acrylic rubber composition containing an acrylic ester polymer having a weight-average molecular weight of at least 8,000,000 as a rubber component.

Further, the present invention provides the above acrylic rubber composition wherein the acrylic ester polymer is obtained from a high polymer emulsion of polymer particles mainly comprising an acrylic ester polymer having a weight-average molecular weight of at least 8,000,000.

Furthermore, the present invention provides the above acrylic rubber composition wherein the acrylic ester polymer is a polymer obtained by emulsion polymerization of a monomer mixture mainly comprising at least one monomer selected from the group consisting of an acrylic ester represented by formula (I):

wherein $R^1$ represents an alkyl group or cyanoalkyl group having from 1 to 18 carbon atoms, and an acrylic ester represented by formula (II):

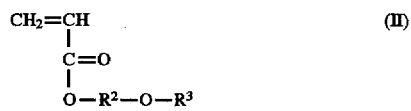

wherein $R^2$ represents an alkylene group having from 1 to 12 carbon atoms; and $R^3$ represents an alkyl group having from 1 to 12 carbon atoms, said emulsion polymerization being carried out in the presence of a polymerization initiator system consisting of an oxidizing agent, a reducing agent, and an activator, with the proportion of the oxidizing agent being from 0.001 to 0.2 parts by weight per 100 parts by weight of the total acrylic ester monomers, and in the presence of a small amount of an emulsifying agent while maintaining the dissolved oxygen concentration of the aqueous phase of the reaction system at lower than the oxygen concentration of a 0.5% aqueous solution of sodium bisulfite.

Still further, the present invention provides the above acrylic rubber composition wherein the acrylic ester polymer is a copolymer containing from 0.5 to 5% by weight of a crosslinking monomer.

The terminology "weight-average molecular weight" as used herein refers to the weight-average molecular weight indicating styrene polymer conversion as measured by gel-permeation chromatography (hereinafter abbreviated as GPC). In the case where the polymer to be analyzed can not be completely dissolved in a solvent, the weight-average molecular weight of the polymer is the value measured for an acrylic ester polymer obtained by replacing the monomer unit containing a functional group responsible for the insolubility, such as an epoxy group, a carboxyl group or an amino group, with a neutral monomer, the main constituent of the polymer.

Conventional acrylic rubber generally has a weight-average molecular weight ranging from 50,000 to 1,000,000. There are no reports referring to an improvement in any physical property with an increase in weight-average molecular weight. With respect to diene rubber which has been the subject of more studies than acrylic rubber, classical literature on high polymer chemistry reports that tensile strength shows a steep rise with an initial increase in weight-average molecular weight but is almost-completely saturated at a weight-average molecular weight of above 500,000 with this tendency continuing up to a weight-average molecular weight of 1,200,000 but that no experiments with higher weight-average molecular weights have been attempted (cf. P. J. Flory, High Polymer Chemistry; Japanese version: translated by Shoten Oka and Kyo Kanamaru, Kobunshi Kagaku, Vol. II, p. 439, FIG. 105, Maruzen K. K. (Jan. 15, 1956)).

Regarding the effects of a molecular weight lower than that of the acrylic rubber of the present invention, Japanese Patent Laid-Open No. 62-64809 describes that acrylic rubber having a number-average molecular weight exceeding 1,200,000 has inferior processability but there is no mention of an ultra-high-molecular-weight region such as in the present invention.

Returning to the case of diene rubber, since an increase in weight-average molecular weight is accompanied by a reduction in processability, a practical weight-average molecular weight of diene rubber is actually about 1,000,000 at the highest.

Further, it is known that the relationship of molecular weight and physical properties in ordinary high polymers inclusive of rubber shows a tendency similar to the above-mentioned diene rubber. From this viewpoint, the fact that ultra-high-molecular-weight acrylic rubber having a weight-average molecular weight of at least 8,000,000 as in accordance with the present invention exhibits markedly improved performance properties is beyond the highest expectations of those skilled in the art.

It is essential that the acrylic ester polymer which can be used in the present invention should have a weight-average molecular weight of at least 8,000,000. An acrylic ester polymer whose weight-average molecular weight is less than 8,000,000, for example between 1,000,000 and 3,000,000 shows no substantial difference in performance from ordinary acrylic rubber having a weight-average molecular weight of about 50,000 to 100,000, and instead tends to have reduced extensibility. With the weight-average molecular weight exceeding about 5,000,000, the once reduced extensibility begins to be restored, but these changes are still small. On exceeding 8,000,000, obvious improvements in physical properties are observed. The upper limit of the weight-average molecular weight of the acrylic ester polymer which can be used in the present invention is not specifically defined because, although a molecular weight of from 8,000,000 to about 10,000,000 is measurable, the methods of molecular weight measurement now available are not reliable for molecular weights above this range.

An acrylic ester polymer having a weight-average molecular weight of at least 8,000,000 can be obtained by the solidificatoin and drying of an emulsion of high polymer particles mainly comprising an acrylic ester polymer having a weight-average molecular weight of at least 8,000,000.

The above-mentioned acrylic ester polymer emulsion comprising ultra-high-molecular-weight polymer particles can be synthesized by, for example, emulsion polymerization. Emulsion polymerization methods effective for increasing molecular weight include methods using an emulsion of ultrafine particles, a reduced polymerization temperature, or a significantly reduced amount of polymerization initiator. It is a matter of course that the emulsion may be prepared by methods other than emulsion polymerization, for example, by the high speed stirring of a polymer under heat.

An example of emulsion polymerization is described below. First, deionized water which has been deoxidized by a deoxidation module (hereinafter referred to as deoxidized deionized water) is charged into a reaction vessel. Separately, a monomer and a small amount of an emulsifying agent were added to the deoxidized deionized water where they were emulsified and the resulting monomer emulsion is then charged into a dropping apparatus. Deoxidized nitrogen gas is introduced into both the reaction vessel and the dropping apparatus until the oxygen concentration of the aqueous phase is reduced to zero ppm or lower as measured by a dissolved oxygen density meter (manufactured by Toa Denpa Kogyo Co.) that has been calibrated to register zero ppm when the electrode of the meter is immersed in a 0.5% aqueous solution of sodium bisulfite. Next, a polymerization initiator with a concentratin of less than 1/10 of that of normal emulsion polymerization is dissolved into the deoxidized deionized water in the raction vessel. Preparations for emulsion polymerization are now complete. Emulsion polymerization is carried out at around room temperature to synthesize a high polymer emulsion having a desired weight-average molecular weight. That is, the emulsion polymerization reaction is preferably conducted at a low temperature in the presence of a polymerization initiator system consisting of an oxidizing agent, a reducing agent, and an activator, with the proportion of the oxidizing agent being from 0.001 to 0.2 part by weight per 100 parts by weight of the total acrylic ester monomers, and in the presence of a small amount of an emulsifying agent while maintaining the dissolved oxygen concentration of the reaction system at lower than that of a 0.5% aqueous solution of sodium bisulfite.

The above specified dissolved oxygen concentration is at such a low level that it can not be attained by the conventional practice of emulsion polymerization wherein the reaction system is merely replaced with nitrogen. However, such a low dissolved oxygen concentration can be reached by, for example, thoroughly bubbling nitrogen gas through the aqueous phase. If the dissolved oxygen concentration exceeds the specified level, polymerization does not proceed unless a polymerization initiator and/or an emulsifying agent is added in an increased amount. This results in the reduction of the molecular weight of the resulting acrylic ester polymer, an impairment of the stability of the emulsion, and deterioration in the mechanical and chemical properties of the resulting vulcanized acrylic rubber composition. In particular, there would be reductions in strength and compression set resistance. That is, even by using an acrylic ester polymer obtained by emulsifying an acrylic ester monomer with or without a crosslinking monomer after simply replacing the reaction system atmosphere with nitrogen as in conventional methods cannot provide an acrylic rubber composition possessing the excellent characteristics achieved by the present invention.

The acrylic ester monomer which can be used in the emulsion polymerization is not particularly limited, as long as it is capable of providing an acrylic rubber.

Typical monomers to be used in the present invention include those represented by formula (I):

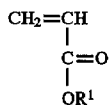 (I)

wherein $R^1$ represents an alkyl group or cyanoalkyl group having from 1 to 18 carbon atoms, and an acrylic ester represented by formula (II):

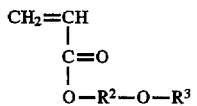 (II)

wherein $R^2$ represents an alkylene group having from 1 to 12 carbon atoms; and R3 represents an alkyl group having from 1 to 12 carbon atoms.

Specific examples of the acrylic ester of formula (I) are methyl acrylate, ethyl acrylate, n-propyl acrylate, n-butyl acrylate, isobutyl acrylate, n-octyl acrylate, n-octadecyl acrylate, 2-ethylhexyl acrylate, cyanomethyl acrylate, 1-cyanoethyl acrylate, 2-cyanoethyl acrylate, and 4-cyanobutyl acrylate, with methyl acrylate and ethyl acrylate being preferred.

Specific examples of the acrylic ester of formula (II) are 2-methoxymethyl acrylate, 2-methoxyethyl acrylate, 2-ethoxyethyl acrylate, 2-(n-propoxy) ethyl acrylate, butoxyethyl acrylate, and 2-(n-butoxy) propyl acrylate, with 2-methoxyethyl acrylate being preferred.

For this invention a high polymer emulsion mainly comprising polymer particles of an acrylic ester polymer can be obtained by emulsion polymerization of at least one type of monomer chosen from the acrylic ester monomers of formula (I) or (II). Or in order to provide the acrylic ester polymer with vulcanizing sites, the acrylic ester monomer may be copolymerized with crosslinking monomers, such as unsaturated monomers having a functional group capable of forming crosslinkage, for example, epoxy-containing unsaturated monomers, e.g., glycidyl acrylate, glycidyl methacrylate, vinyl glycidyl ether, and allyl glycidyl ether; carboxyl-containing unsaturated monomers, e.g., acrylic acid, methacrylic acid, crotonic acid, vinylacetic acid, maleic acid, fumaric acid, iraconic acid, cinnamic acid, monomethyl maleate, monoethyl maleate, and monobutyl maleate; halogen-containing unsaturated monomers, e.g., vinyl chloroacetate, vinyl bromoacetate, α-chloropropionvinyl, allyl chloroacetate, allyl bromoacetate, chloroethyl acrylate, chloro-n-propyl acrylate, chloroethyl vinyl ether, and chloromethylstyrene; basic nitrogen-containing unsaturated monomers, e.g., vinylamine and N-vinylimidazole; and diene unsaturated monomers, e.g., butadiene.

Acrylic ester copolymers obtained by copolymerizing the acrylic ester monomer and the crosslinking monomer are vulcanizable to provide vulcanized rubber having remarkably improved mechanical strength and compression set resistance as compared with those containing no crosslinking monomer.

The crosslinking monomer is used in an amount of from 0.5 to 5% by weight, preferably from 1 to 1.5% by weight, based on the total weight of acrylic ester monomers. If the amount of the crosslinking monomer is less than 0.5% by weight, the effect of the addition can not be recognized. If it exceeds 5% by weight, extensibility, an inherent feature of rubber, is reduced.

If necesarry, in order to obtain well-balanced physical properties, the acrylic ester polymer of this invention may further be copolymerized with other unsaturated monomers, such as α-methylstyrene, styrene, acrylonitrile, methacrylonitrile, acrylamide, methacrylamide, N-methylolamide, hydroxyethyl acrylate, hydroxypropyl acrylate, hydroxyethyl methacrylate, vinyl acetate, vinylidene chloride, ethylene, and dicyclopentenyl acrylate, and unsaturated macromonomers, such as acryloylpolydimethylsiloxane. These unsaturated monomers or macromonomers can be used, as necessary, in an amount of not more than 30% by weight based on the total monomers.

The polymerization initiator which can be used for preparing an acrylic ester polymer having a weight average molecular Weight of not less than 8,000,000 is a combination of an oxidizing agent, a reducing agent, and an activator. The oxidizing agent is used in a ratio of from 0.001 to 0.2 part by weight, preferably from 0.01 to 0.1 part by weight, per 100 parts by weight of the total monomers. If the amount of the oxidizing agent is less than 0.001 part by weight, the reaction not only needs a great deal of time but it is never fully completed. If it exceeds 0.2 part by weight, the resulting polymer has a reduced degree of polymerization.

The oxidizing agents which can be used in the present invention include hydroperoxides, such as cumene hydroperoxide, t-butyl hydroperoxide, di-isopropylbenzene hydroperoxide, p-menthane hydroperoxide, 1,1,3,3-tetramethylbutyl hydroperoxide, and 2,5-dimethylhexane-2, 5-dihydroperoxide; and persulfates, such as potassium persulfate and ammonium persulfate.

The reducing agents which can be used in the present invention include glucose, dextrose, sodium formaldehyde sulfoxylate (Rongalit), and sodium thiosulfate.

The activators which can be used in the present invention include ferrous sulfate, copper sulfate, and potassium hexacyanoferrate (III).

The amounts of the reducing agent and the activator are appropriately selected depending on the combination of the initiator system.

The emulsifying agent to be used for emulsion polymerization may be anionic, nonionic or cationic or may be a reactive emulsifying agent.

The emulsifying agent is used in an amount of from 0.5 to 5 parts by weight, preferably from 0.5 to 3 parts by weight, per 100 parts by weight of the total monomers. If the amount of the emulsifying agent is less than 0.5 part by weight, the emulsion tends to have poor stability and a low rate of reaction. If it exceeds 5 parts by weight, the resulting acrylic ester polymer tends to have poor water resistance, mechanical properties and chemical properties.

Components used in emulsion polymerization other than monomers and emulsifying agent, such as protective colloids, and additives, such as pH adjusting agents, fillers, and plasticizers, are not particularly limited, and any known compounds can be used.

The polymerization temperature is selected arbitrarily from the range in which the polymerization initiator system decomposes. However, a high polymerization temperature results in the formation of a grafted polymer or reduction in molecular weight of the polymer produced and thus is not advisable. This, the polymerization temperature is usually not higher than 50° C., preferably not higher than 30° C.

The thus prepared high polymer emulsion mainly comprising polymer particles of an acrylic ester polymer having a weight-average molecular weight of not less than 8,000,000 is then formulated into an acrylic rubber composition of the present invention. The acrylic rubber composition can be prepared by any method known in the art, and the working steps and chemicals to be combined are selected arbitrarily according to desired performance.

Solidification of the polymer emulsion, which is the first step for preparing an acrylic rubber composition, can easily be carried out by known techniques, such as the addition of a salt or lyophilization. In the roll milling step, the acrylic rubber composition of the present invention can be milled extremely smoothly without encountering the usual difficulties of conventional acrylic rubber compositions, i.e., conventional rubber sticks to mill rolls and cannot be easily parted. This ease in roll milling of the rubber composition of the present invention is attributed to the ultra-high-molecular weight of the high polymer component.

When preparing the acrylic rubber composition of the present invention, crosslinking agents, reinforcing agents, fillers, plasticizers, softeners, parting agents, stabilizers, and crosslinking rate regulators etc. may be combined with the acrylic rubber composition according to desired objective properties. In particular, the amount of crosslinking agent to be added may be smaller than usual, which is also ascribable to the above-described characteristics of the present invention.

The crosslinking agent which can be used in the present invention is not particularly limited and can be appropriately selected by taking into consideration the acrylic ester polymer composition and the kind of crosslinking monomer incorporated into the acrylic ester polymer.

How the acrylic rubber composition according to the present invention exhibits the above-mentioned remarkable effects is unclear but might be accounted for as follows: conventional acrylic rubber compositions have lower weight-average molecular weights than the acrylic rubber composition of the present invention and they owe their rubbery characteristics exclusively to chemical crosslinkage. However, in the acrylic rubber composition of the present invention the main chain has an extremely high weight-average molecular weight thereby causing physical entanglement, said entanglement acting like movable crosslink points. Further, the main chain is long and so it is difficult to loosen the entanglement. Therefore, the acrylic rubber composition of the present invention exhibits superior characteristics as rubber even when put to practical use together with the chemical crosslinkage formed by conventional processes. It would also be safe to assume that the increase in molecular weight decreases the number of molecular ends, thereby leading to improvements in gasoline resistance and the like.

The reason why the aforesaid effects of the present invention have not hitherto been noticed seems to be that rubber having such an ultra-high-molecular weight has never been synthesized, put into trial products, and examined. In fact, it was a great surprise even to the present inventors to find that an acrylic rubber with such excellent properties can be obtained by increasing the weight-average molecular weight to such an extremely high degree.

BEST MODE FOR CARRYING OUT THE INVENTION

The present invention will now be illustrated in greater detail with reference to the Examples in view of the Comparative Examples.

EXAMPLE 1

In a 2 liters six-necked flask equipped with a stirrer, a thermometer, a condenser, dropping funnels, an inlet for nitrogen gas, and electrodes of an oxygen density meter was charged 150 g of deoxidized deionized water that was prepared by blowing nitrogen gas into deionized water until the oxygen meter registered zero, the oxygen meter having been calibrated to zero in a 0.5% sodium bisulfite aqueous solution.

In a 2 liters beaker were charged 500 g of ethyl acrylate, 15 g of glycidyl methacrylate, 5 g of sodium dodecylbenzenesulfonate Newlex H (anionic emulsifying agent, produced by Nippon oil and Fats Co., Ltd.), and 300 g of deoxidized deionized water which was prepared by blowing nitrogen gas into deionized water until the oxygen meter registered zero, the oxygen meter having been calibrated to zero in a 0.5% sodium bisulfite aqueous solution. The mixture was emulsified by a homomixer to prepare a monomer emulsion. The monomer emulsion was transferred to a dropping funnel.

Deoxidized nitrogen gas was introduced to both the 6-necked flask and the dropping funnel at a rate of 100 ml/min until the oxygen meter registered zero, the oxygen meter having been calibrated to zero in a 0.5% sodium bisulfite aqueous solution. The dissolved oxygen concentration became zero after about 2-hours of nitrogen introduction.

When both systems reached a zero oxygen concentration, the monomer emulsion, 25 g of a 0.5% Perbutyl H aqueous solution of Perbutyl H (t-butyl hydroperoxide, produced by Nippon Oil and Fats Co., Ltd.) dissolved in deoxidized deionized water, and 25 g of a 0.5% Rongalit aqueous solution of Rongalit dissolved in deoxidized deionized water were dripped into the flask from their respective dropping funnels over a period of 4 hours. However, 5 g of the 25 g of the Perbutyl H aqueous solution, 5 g of the 25 g of the Rongalit aqueous solution, and 1 g of a 2% aqueous solution of ammonium iron (II) sulfate (Mohr's salt) dissolved in deoxidized deionized water were dripped into the system at the initiation of emulsion polymerization. The system was allowed to react at a temperature of from 25° to 30° C. for 4 hours.

After completion of the polymerization reaction, the resulting emulsion (solid content: 51%) was lyophilized, washed with water, and dried to obtain an acrylic ester polymer (designated polymer (a)). Polymer (a) swelled with tetrahydrofuran but did not completely dissolve.

Thus an ethyl acrylate polymer was prepared in the same manner as polymer (a), except that glycidyl methacrylate was replaced with ethyl acrylate. The resulting polymer was dissolved in tetrahydrofuran and subjected to GPC. As a result, the weight-average molecular weight (Mw) indicating polystyrene conversion of the polymer was found to be 9,800,000.

COMPARATIVE EXAMPLE 1

A polymer emulsion having a solid content of 50.5% was prepared in the same manner as in Example 1, except for replacing 25 g of a 0.5% Perbutyl H aqueous solution with 25 g of a 5% Perbutyl H aqueous solution, replacing 25 g of a 0.5% Rongalit aqueous solution with 25 g of a 5% Rongalit aqueous solution, and changing the polymerization temperature from 25° to 30° C. range to a range of from 60° to 65° C. The polymer emulsion was carried out in the same manner as in Example 1 to obtain ethyl acrylate polymer (b). Polymer (b) was found to have an Mw of 650,000 indicating polystyrene conversion as measured by GPC in tetrahydrofuran.

Both polymers (a) and (b) prepared in Example 1 and Comparative Example 1 were mixed with the components shown in Table 1 below to prepare acrylic rubber composition (A) and (B), respectively.

TABLE

| Components (part by weight) | Acrylic Rubber Composition | |
|---|---|---|
| | (A) | (B) |
| Polymer (a) | 100 | — |
| Polymer (b) | — | 100 |
| Stearic acid | 1 | 1 |
| Hexamethylenediamine carbamate | 1.13 | 1.13 |
| Titanium oxide (R-930) | 5 | 5 |
| Silicon oxide (Hymil 223) | 20 | 20 |
| Plasticizer (Adekasizer RC-735) | 5 | 5 |

Compositions (A) and (B) were each roll milled and then press cured at 155° C. for 30 minutes to obtain vulcanized acrylic rubber (A-1) and (B-1), respectively. The physical properties of the resulting rubber were measured in accordance with JIS K6301 and the results obtained are shown in Table 2.

TABLE 2

| | Example 1 | Comparative Example 1 |
|---|---|---|
| Vulcanized acrylic rubber: | (A-1) | (B-1) |
| Tensile strength (kgf/cm2) | 30 | 110 |
| Extensibility (%) | 600 | 300 |
| Hardness (JIS-A) | 60 | 72 |
| Compression set (120° C. × 70 hrs) (%) | 28 | 54 |
| Heat resistance (heated air aging; 120° C. × 70 hrs): | | |
| Rate of change in tensile strength | +15 | +30 |
| Rate of change in extensibility | <21 | −35 |
| Rate of change in hardness | +8 | +13 |
| Gasoline resistance (40° C. × 48 hrs immersion in Fuel C): | | |
| Rate of change in volume (Δ V) (%) | +25 | +50 |
| Oil resistance (150° C. × 70 hrs immersion in JIS #3 Oil): | | |
| Rate of change in volume (Δ V) (%) | +20 | +30 |
| Cold resistance (impact brittle temperature) (°C.) | −18 | −8 |

EXAMPLE 2

In a 2 liters six-necked flask equipped with a stirrer, a thermometer, a condenser, a dropping funnel, an inlet for nitrogen gas, and electrodes of an oxygen density meter was charged 150 g of deoxidized deionized water that was prepared by blowing nitrogen gas into deionized water until the oxygen meter registered zero, the oxygen meter having been calibrated to zero in a 0.5% sodium bisulfite aqueous solution.

In a 2 liters beaker were charged 500 g of ethyl acrylate, 5 g of glycidyl methacrylate, 5 g of Newlex H, and 300 g of deoxidized deionized water which was prepared by blowing nitrogen gas into deionized water until the oxygen density meter registered zero, the oxygen density meter having been calibrated to zero in a 0.5% sodium bisulfite aqueous solution. The mixture was emulsified by a homomixer to prepare a monomer emulsion. The monomer emulsion was transferred to a dropping funnel.

Nitrogen gas was introduced to both the 6-necked flask and the dropping funnel at a rate of 100 ml/min until the oxygen density meter registered zero, the oxygen density meter having been calibrated to zero in a 0.5% sodium bisulfite aqueous solution. The dissolved oxygen concentration became zero after about 2-hours' nitrogen introduction.

When both system reached a zero oxygen concentration, the monomer emulsion, 25 g of a 0.5% Perbutyl H aqueous solution of Perbutyl H dissolved in deoxidized deionized water, and 25 g of a 0.5% Rongalit aqueous solution of Rongalit dissolved in deoxidized deionized water were dripped into the flask from their respective dropping funnels over a period of 4 hours. However, 5 g of the 25 g of the Perbutyl H aqueous solution, 5 g of the 25 g of the Rongalit aqueous solution, and 1 g of a 2% aqueous solution of ammonium iron (II) sulfate (Mohr's salt) dissolved in deoxidized deionized water were dripped into the system at the starting time of emulsion polymerization. The system was allowed to react at a temperature of from 25° to 30° C. for 4 hours.

After completion of the polymerization reaction, the resulting emulsion (solid content: 49.5%) was lyophilized, washed with water, and dried to obtain an acrylic ester polymer (designated polymer (c)). Polymer (c) swelled with tetrahydrofuran but did not completely dissolve.

Thus, a tetrahydrofuran-soluble ethyl acrylate polymer was prepared in the same manner as polymer (c), except that glycidyl methacrylate was replaced with ethyl acrylate. As a result of GPC in tetrahydrofuran, the Mw (polystyrene conversion) of the polymer was substantially equal to that of the polymer of Example 1.

EXAMPLE 3

Acrylic ester polymer (d) was prepared in the same manner as Example 2, except for changing the amount of glycidyl methacrylate to 7.5 g. The solid content of the resulting polymer emulsion prepared was 49.6%.

Since polymer (d) was insoluble in tetrahydrofuran, a tetrahydrofuran-soluble polymer was prepared in the same manner as polymer (d), except that the glycidyl methacrylate in the monomer emulsion was replaced with ethyl acrylate. GPC of the resulting polymer revealed a MW substantially equal (in tetrahydrofuran, polystyrene conversion) to that of the polymer of Example 1.

EXAMPLE 4

Acrylic ester polymer (e) was prepared in the same manner as Example 1, except for changing the amount of glycidyl methacrylate to 25 g. The solid content of the resulting polymer emulsion was 50.4%.

The Mw obtained by GPC for polymer (e) which was prepared in the same manner as in Example 1 was substantially equal to that of the polymer of Example 1 (for polystyrene conversion).

EXAMPLE 5

Acrylic ester polymer (f) was prepared in the same manner as Example 1, except for changing the amount of glycidyl methacrylate to 2.5 g. The solid content of the resulting polymer emulsion was 49.4%.

The Mw obtained by GPC for the polymer (f) which was prepared in the same manner as in Example 1 was substantially equal to the polymer of Example 1 (for polystyrene conversion).

EXAMPLE 6

Acrylic ester polymer (g) was prepared in the same manner as Example 1, except for replacing 5 g of glycidyl methacrylate with 5 g of vinyl monochloroacetate. The solid content of the resulting polymer emulsion was 49.0%.

Polymer (g) swelled but was not completely insoluble in tetrahydrofuran. Thus, a tetrahydrofuran-soluble polymer was prepared in the same manner as polymer (a), except for replacing the vinyl monochloroacetate in the monomer emulsion with ethyl acrylate. GPC of the resulting polymer revealed an Mw (in tetrahydrofuran, polystyrene conversion) of 9,500,000.

EXAMPLE 7

Acrylic ester polymer (h) was prepared in the same manner as Example 6, except for changing the amount of vinyl monochloroacetate to 7.5 g. The solid content of the resulting polymer emulsion was 49.1%.

The Mw obtained by GPC for the polymer (h) which was prepared in the same manner as Example 6 was substantially equal to that of the polymer of Example 6 (for polystyrene conversion).

EXAMPLE 8

Acrylic ester polymer (i) was prepared in the same manner as Example 6, except for changing the amount of vinyl monochloroacetate to 25 g. The solid content of the resulting polymer emulsion was 49.9%.

The Mw obtained by GPC for the polymer (i) which was prepared in the same manner as Example 6 was substantially equal to that of Example 6 (for polystyrene conversion).

EXAMPLE 9

Acrylic ester polymer (j) was prepared in the same manner as in Example 6, except for changing the amount of vinyl monochloroacetate to 2.5 g. The solid content of the resulting polymer emulsion was 48.9%.

The Mw obtained by GPC for the polymer (j) which was prepared in the same manner as Example 6 was substantially equal to that of the polymer of Example 6 (for polystyrene conversion).

EXAMPLE 10

Acrylic ester polymer (k) was prepared in the same manner as in Example 1, except for changing the amount of glycidyl methacrylate to 2.0 g. The solid content of the resulting polymer emulsion was 48.9%.

The Mw obtained by GPC for the polymer (k) which was prepared in the same manner as Example 1 was substantially equal to that of the polymer of Example 1 (for polystyrene conversion).

EXAMPLE 11

Acrylic ester polymer (l) was prepared in the same manner as in Example 1, except for changing the amount of glycidyl methacrylate to 30 g. The solid content of the resulting polymer emulsion was 50.7%.

The Mw obtained by GPC for the polymer (l) which was prepared in the same manner as Example 1 was substantially equal to that of the polymer of Example 1 (for polystyrene conversion).

EXAMPLE 12

Acrylic ester polymer (m) was prepared in the same manner as Example 6, except for changing the amount of vinyl monochloroacetate to 2.0 g. The solid content of the resulting polymer emulsion was 48.8%.

The Mw obtained by GPC for the polymer (m) which was prepared in the same manner as Example 6 was substantially equal to that of the polymer of Example 6 (for polystyrene conversion).

EXAMPLE 13

Acrylic ester polymer (n) was prepared in the same manner as Example 6, except for changing the amount of vinyl monochloroacetate to 30 g. The solid content of the resulting polymer emulsion was 50.1%.

The Mw obtained by GPC for the polymer (n) which was prepared in the same manner as Example 6 was substantially equal to that of the polymer of Example 6 (for polystyrene conversion).

Each of the acrylic ester polymers (c) to (f), (k) and (l) obtained in Examples 2 to 5 and 10 to 11 was mixed with the components shown in Table 3 below to prepare acrylic rubber compositions (C) to (F), (K), and (L), respectively.

TABLE 3

| | |
|---|---|
| Acrylic ester polymer | 100 parts by weight |
| Stearic acid | 1 part by weight |
| HAF carbon (Shoblack N330) | 50 parts by weight |
| Nocrack CD* | 2 parts by weight |
| Accelerator AB** | 1 part by weight |

Note:
*Aromatic secondary amine type antioxidant
**Ammonium benzoate, vulcanization-accelerator The resulting acrylic rubber compositions (C) to (F), (K), and (L) were each milled with a 6-inch roll and subjected to primary vulcanization with an electrically heated press at 170° C. for 20 minutes and then secondary vulcanization in an oven at 150° C. for 15 hours to obtain vulcanized acrylic rubber (C-1), (D-1), (E-1), (F-1), (K-1) and (L-1), respectively. The physical properties of the resulting samples of vulcanized acrylic rubber were measured in accordance with JIS K6301. The results obtained are shown in Table 4 below.

TABLE 4

| | Example No. | | | | | |
|---|---|---|---|---|---|---|
| | 2 | 3 | 4 | 5 | 10 | 11 |
| Vulcanized acrylic rubber | (C-1) | (D-1) | (E-1) | (F-1) | (K-1) | (L-1) |
| Tensile strength (kgf/cm) | 170 | 180 | 170 | 138 | 120 | 165 |
| Extensibility (%) | 430 | 320 | 140 | 600 | 600 | 130 |
| Hardness (JIS-A) | 64 | 65 | 69 | 60 | 58 | 69 |
| Tear strength (kgf/cm) | 32 | 31 | 22 | 31 | 34 | 19 |
| Compression set (%) | 36.5 | 29.8 | 28.4 | 47.2 | 58.0 | 25.0 |
| Rate of change in volume* (%) | 16.5 | 15.9 | 14.6 | 17.2 | 18.7 | 14.0 |

Note:
*Measured after immersion in JIS #3 Oil at 150° C. for 72 hours.

Each of the acrylic ester polymers (g) to (j), (m), and (n) obtained in Examples 6 to 9 and 12 to 13 was mixed with the components shown in Table 5 below to prepare acrylic rubber compositions (G) to (J), (M) and (N), respectively.

TABLE 5

| | |
|---|---|
| Acrylic ester polymer | 100 parts by weight |
| Stearic acid | 1 part by weight |
| AF carbon (Shoblack N330) | 50 parts by weight |

TABLE 5-continued

| | |
|---|---|
| Nocrack CD | 2 parts by weight |
| Sodium stearate | 0.5 part by weight |
| Potassium stearate | 0.3 part by weight |

The resulting acrylic rubber compositions (G) to (J), (M) and (N) were each milled with a 6-inch roll mill subjected to primary vulcanization with an electrically heated press at 170° C. for 20 minutes and then secondary vulcanization in an oven at 150° C. for 15 hours to obtain samples of vulcanized acrylic rubber (G-1), (H-1), (I-1), (J-1), (M-1) and (N-1), respectively. The physical properties of the resulting samples of vulcanized acrylic rubber were measured in accordance with JIS K6301. The results obtained are shown in Table 6 below.

TABLE 6

| | Example No. | | | | | |
|---|---|---|---|---|---|---|
| | 6 | 7 | 8 | 9 | 12 | 13 |
| Vulcanized acrylic rubber | (G-1) | (H-1) | (I-1) | (J-1) | (M-1) | (N-1) |
| Tensile strength (kgf/cm) | 177 | 181 | 171 | 164 | 115 | 158 |
| Extensibility (%) | 340 | 280 | 150 | 480 | 430 | 140 |
| Hardness (JIS-A) | 65 | 67 | 69 | 66 | 62 | 70 |
| Tear strength (kgf/cm) | 30 | 29 | 27 | 33 | 36 | 25 |
| Compression set (%) | 29.4 | 20.8 | 21.3 | 30.7 | 40.4 | 22.0 |
| Rate of change in volume* (%) | 17.5 | 14.7 | 17.2 | 17.0 | 18.7 | 14.5 |

Note:
*Measured after immersion in JIS #3 Oil at 150° C. for 72 hours.

Throughout the specification of the present invention, the term "weight average molecular weight" means the value obtained by GPC using the following parameters:

Sample: A 0.2% solution in tetrahydrofuran having been filtered through a Shodex DT MX-13K filter.

Chromatograph: Shodex GPC SYSTEM-11, manufactured by Showa Denko, K. K.

Column: Shodex KF-807, manufactured by Showa Denko, K. K.

Industrial Applicability

According to the present invention, an acrylic rubber composition free from the disadvantages associated with conventional acrylic rubber can be obtained at a low cost by avoiding the use of expensive raw materials and complicated and therefore costly steps. The acrylic rubber composition of the present invention shows improvements in the properties inherently possessed by acrylic rubber, i.e., heat resistance, oil resistance, weather resistance, and ozone resistance; exhibits excellent roll processability, gasoline resistance, gas hole resistance, and tensile strength/extensibility balance; and in addition, has high mechanical strength and excellent compression set resistance.

We claim:

1. An acrylic rubber composition containing an acrylic ester polymer having a weight-average molecular weight of at least 8,000,000 as a rubber component, said acrylic ester polymer being a polymer obtained by emulsion polymerization of a monomer mixture mainly comprising at least one monomer selected from the group consisting of an acrylic ester represented by formula (I):

wherein $R^1$ represents an alkyl group or cyanoalkyl group having from 1 to 18 carbon atoms, and an acrylic ester represented by formula (II):

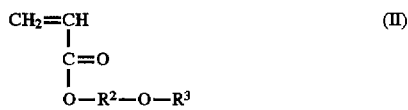

wherein $R^2$ represents an alkylene group having from 1 to 12 carbon atoms; and $R^3$ represents an alkyl group having from 1 to 12 carbon atoms, said emulsion polymerization being carried out in the presence of a polymerization initiator system consisting of an oxidizing agent, a reducing agent, and an activator, with the proportion of said oxidizing agent being from 0.001 to 0.2 parts by weight per 100 parts by weight of the total acrylic ester monomers, and in the presence of a small amount of an emulsifying agent, while maintaining the dissolved oxygen concentration of the aqueous phase of the reaction system at lower than that of a 0.5% aqueous solution of sodium bisulfite, said weight-average molecular weight indicating styrene polymer conversion measured by gel-permeation chromatography, or, when said acrylic ester polymer can not be completely dissolved in a solvent for gel-permeation chromatography, the weight-average molecular weight being measured for an acrylic ester polymer obtained by replacing the monomer unit containing a functional group responsible for the insolubility, with a neutral monomer, the main constituent of said acrylic ester polymer.

2. An acrylic rubber composition as claimed in claim 1, wherein said acrylic ester polymer is a polymer obtained from a high polymer emulsion of polymer particles mainly comprising an acrylic ester polymer having a weight-average molecular weight of at least 8,000,000.

3. An acrylic rubber composition as claimed in claim 1, wherein said acrylic ester polymer is a copolymer containing from 0.5 to 5% by weight of a crosslinking monomer.

4. An acrylic rubber composition as claimed in claim 2, wherein said acrylic ester polymer is a copolymer containing from 0.5 to 5% by weight of a crosslinking monomer.

* * * * *